Dec. 2, 1969  N. INOUE  3,481,190

PRESSURE VESSEL FOR STRESSING WORK SPECIMENS

Filed Jan. 25, 1968  3 Sheets-Sheet 1

INVENTOR
NOBUO INOUE
BY
Howson & Howson
ATTYS

Dec. 2, 1969   N. INOUE   3,481,190
PRESSURE VESSEL FOR STRESSING WORK SPECIMENS
Filed Jan. 25, 1968   3 Sheets-Sheet 2

INVENTOR:
NOBUO INOUE
BY
Howson & Howson
ATTYS.

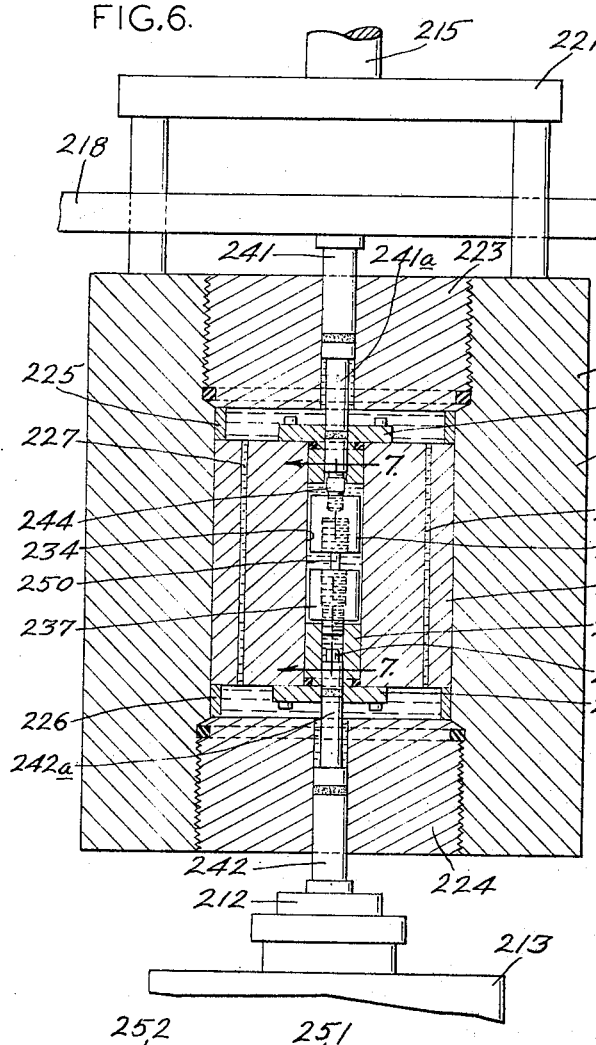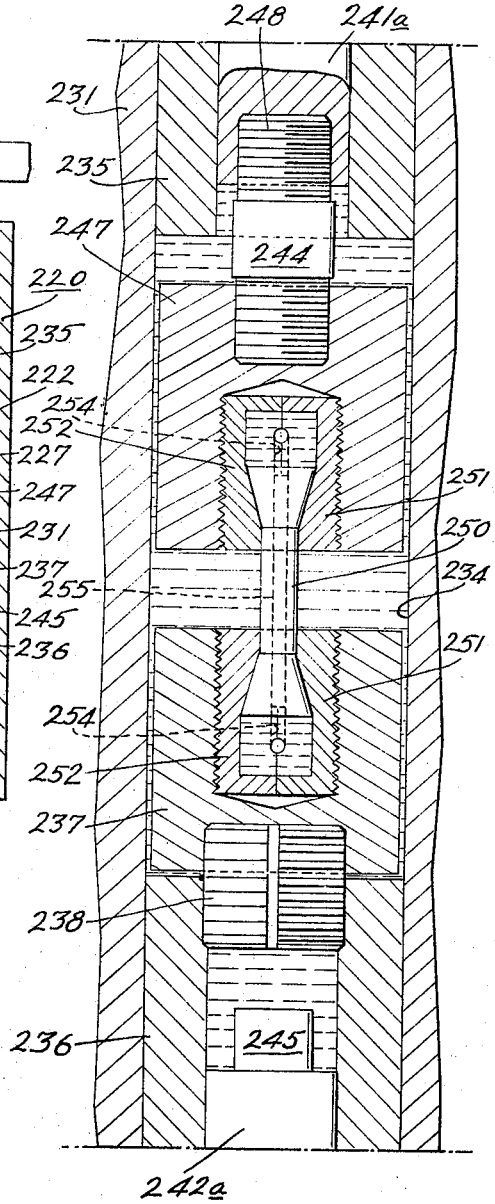

United States Patent Office 3,481,190
Patented Dec. 2, 1969

3,481,190
PRESSURE VESSEL FOR STRESSING WORK SPECIMENS
Nobuo Inoue, Villanova, Pa., assignor to The Franklin Institute, Philadelphia, Pa., a corporation of Pennsylvania
Filed Jan. 25, 1968, Ser. No. 700,493
Int. Cl. G01n *3/08;* G01m *3/02*
U.S. Cl. 73—94                                                  9 Claims

ABSTRACT OF THE DISCLOSURE

Apparatus for stressing work specimens in a pressurized environment wherein the specimen is mounted within a pressure cylinder having a pair of opposed pistons slidably mounted therein. The opposed pistons are displaced relative to one another to pressurized pressure fluid within the cylinder and are held to provide a pressurized environment. The work specimen is stressed between the cylinder structure and one of the pistons upon displacement of the cylinder relative to the opposed pistons.

---

The present invention relates to apparatus for stressing work specimens, and has particular application to apparatus for stressing specimens in a pressurized environment.

It has been discovered that certain materials obtain improved characteristics if they are stressed while subject to a pressurized atmosphere. For example, beryllium bars become less brittle if they are pre-strained under hydrostatic pressure in the neighborhood of 2000 p.s.i.

Prior to the present invention, stressing of work specimens in this manner was accomplished by mounting the specimen in a pressure cylinder having a predetermined charge of pressure fluid therein. The volume of the charge was calculated so as to provide the desired pressurized environment at the point in the piston travel wherein the desired stress was imparted to the test specimen. Such apparatus does not provide a uniform pressure environment for the specimen since the movement of the piston within the cylinder changes the pressure of the pressure fluid during the stressing operation. Where the material has a high strain relative to its stress, the displacement of the piston during the stressing operation may be substantial, resulting in a considerable change in the pressure environment during the operation.

With the foregoing in mind, the present invention provides a novel apparatus wherein the pressure environment for the work specimen is maintained uniformly at a constant level as the specimen is stressed, thereby eliminating the effect of variable pressure upon the stressed specimen.

More specifically, the present invention provides an improved pressure vessel, having a pair of opposed pistons slidably mounted in a bore therein, whereby the displacement of the pistons relative to one another determines the pressure of the fluid contained within the bore. The stressing of the specimen is accomplished while maintaining the pistons fixed relative to one another within the bore, displacing the vessel relative to the fixed pistons to effect the stress upon the work piece mounted between the vessel and one of the pistons.

In a preferred embodiment of the invention, the test apparatus includes a sleeve mounted within the bore to support the work specimen relative in the vessel and a work element mounted on one of the pistons operable upon displacement of the vessel relative to the two pistons to stress the specimen mounted therein.

All of the objects of the invention are more fully set forth hereinafter with reference to the accompanying drawing wherein:

FIG. 6 is a sectional view through another embodiment of a stress stand showing an arrangement for imparting tensile stress to a work specimen in a pressure environment substantially higher than that afforded by the apparatus shown in FIGS. 3–5;

FIG. 7 is an enlarged sectional view taken on the line 7—7 of FIG. 6; and

FIG. 8 is an exploded perspective view illustrating the mounting members for imparting tensile stress to the work specimen.

Figure 1:
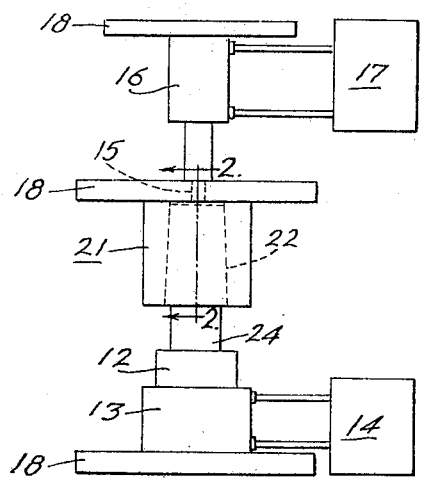
FIG. 1 is a diagrammatic view of a conventional stress stand of the prior art.

Referring now to the prior art apparatus shown in FIG. 1, the stress stand illustrated therein comprises a framework 18 having an upper jack 16 with suitable hydraulic controls 17 and a lower jack 13 with suitable hydraulic controls 14. The upper jack 16 has a piston 15 projecting downwardly through the frame 18 (see FIG. 2) and the lower jack 13 has a driver 12 projecting upwardly therefrom. Equipment of this type is available from several suppliers, and a typical arrangement is to utilize a 125-ton jack in the upper section at 16 and to utilize a 500-ton jack in the lower section at 13. The controls 14 and 17 may include the usual indicators, recorders, pumping systems, etc.

Figure 2:
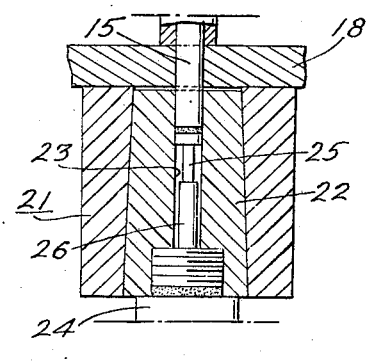
FIG. 2 is a sectional view taken on the line 2—2 of FIG. 1.

In conventional arrangements prior to the present invention, as shown in FIGS. 1 and 2, a stressing housing 21 is positioned in the frame 18 intermediate the jacks 13 and 16. The housing 21 has an upwardly tapered receptacle which receives a pressure chamber 22 having an outer tapered wall mating with the recptacle. The chamber 22 has a longitudinal bore 23 therethrough which is closed at its lower end by a plug 24 and is closed at its upper end by the piston 15 of the upper jack. A charge of a suitable pressure fluid, for example a fluid composed of 50% pentane and 50% iso-pentane, is injected into the bore 23 to provide a pressure environment therein when the piston 15 is displaced toward the plug 24. The driver 12 of the lower jack bears against the plug 24 to provide a back-up force against the pressure within the bore. In the same manner, the upward pressure on the plug tends to drive the chamber 22 further into the receptacle 21, the tapered walls producing an inward force component which reinforces the chamber against the radial outward pressure of the fluid in the bore.

In operation, a work specimen 25 is mounted in the bore 23 and is stressed between the piston 15 and the plug 24. A load cell 26 is interposed between the specimen 25 and the plug 24 to afford measurement of the stress applied by the piston 15. Suitable connections (not shown) are provided between the cell 26 and the controls 17 to regulate the stress to the desired level. In this manner, by proper selection of the charge of pressure fluid, the specimen is stressed to the desired extent within a pressurized environment. However, when the stress is changed, or when it is desired to alter the pressure of the environment, the apparatus must be disassembled sufficiently to enable a change in the charge of pressure fluid contained in the bore 23.

Figure 3:
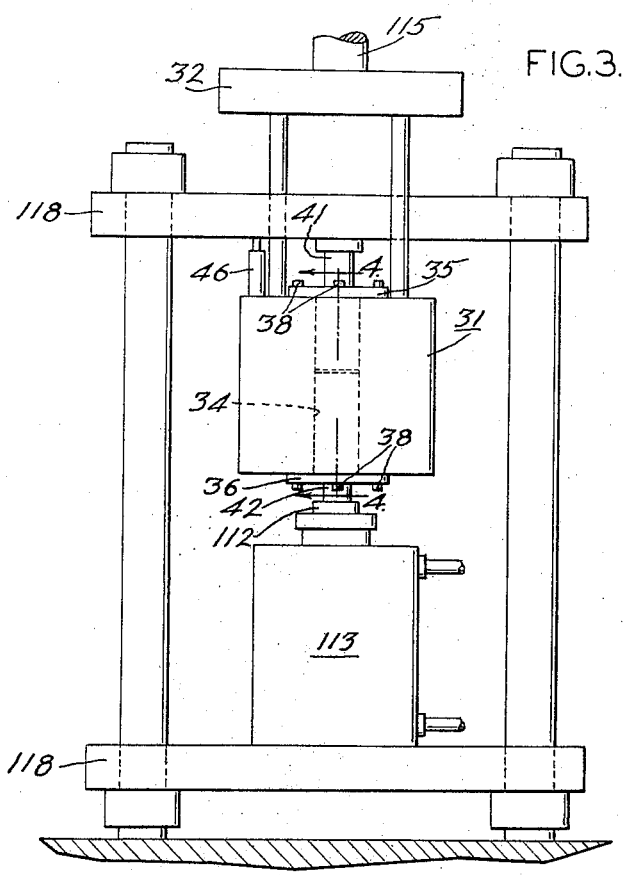
FIG. 3 is a fragmentary view of a stress stand embodying the present invention.
Figure 4:
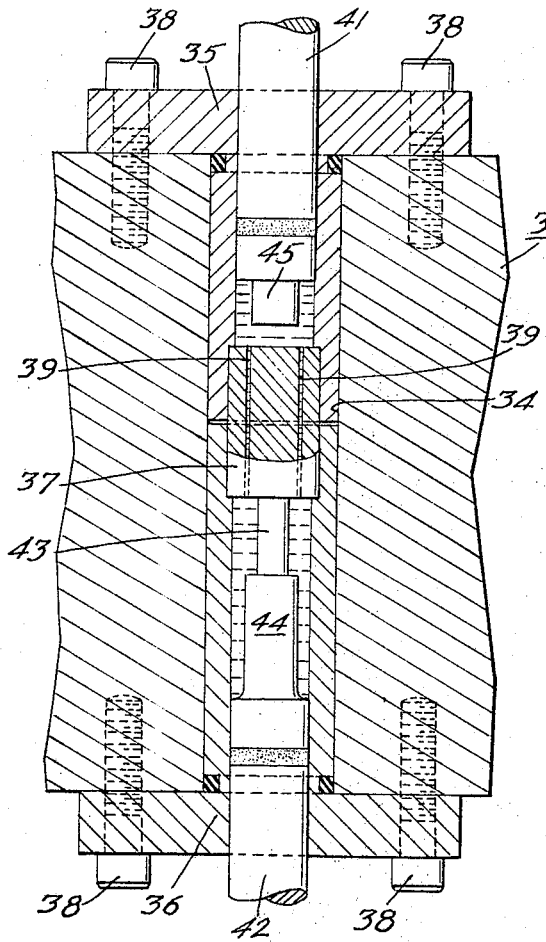
FIG. 4 is a sectional view taken on the line 4—4 of FIG. 3 with a work specimen mounted therein for compressive stress in a uniform pressure environment.

The apparatus of the present invention may be incorporated in a stress stand similar to the stand shown in FIG. 1 including frame members 118 (see FIG. 3), an upper jack having a piston 115 and a lower jack 113 having a driver 112. In the embodiment of the invention illustrated in FIG. 3, a pressure chamber or stressing housing 31 is suspended within the frame 118 in alignment with the driver 112 of the lower jack 113 from a cross arm 32 mounted on the piston 115 of the upper jack. The chamber 31 has a bore 34 having mounted therein a pair of opposed lining sleeves 35 and 36 (see FIG. 4). The sleeves, in turn, mount therebetween a work holder 37 which is rigidly clamped relative to the chamber 31 by suitable fasteners 38 for the sleeve members 35 and 36. In the embodiment of FIG. 4, the work holder 37 comprises a cylindrical member having fluid passageways 39 extending therethrough to afford fluid communication from one side to the other. The specimen to be stressed, as shown at 43 in FIG. 4, is abutted at its upper end against the work holder 37 and at its lower end against a load cell 44 carried by the piston 42.

In order to pressurize the fluid in the bore 34, opposed pistons 41 and 42 are slidable in the sleeves 35 and 36. The upper piston 41 is mounted on the frame 118 as indicated in FIG. 3, and the lower piston 42 is mounted on the driver 112 of the jack 113. Thus, when the lower jack is operated, the piston 42 operates in opposition to the piston 41 to compress the pressure fluid contained in the bore 34 to provide a pressure environment in which a work specimen may be stressed. A coil gage 45 may be mounted on the upper piston 41 to measure the pressure of the contained fluid.

In operation, the stress apparatus is assembled substantially as shown in FIG. 4 with the stress specimen 43 carried between the work holder 37 and the lower piston 42. The piston 42 is then advanced toward the piston 41 to compress the pressure fluid contained in the bore 34. During this operation, the housing 31 is free to be displaced upwardly with the piston 42 so as to avoid stressing the work specimen 43 during the pressurizing operation. When the desired pressure environment is achieved within the bore 34, as indicated by the coil gage 45, the piston 42 is arrested in its advance to maintain the proper spacing between the pistons 42 and 41 and thereby maintain the desired compression of the pressure fluid in the bore. The apparatus is then in condition to initiate stressing of the work member 43. At this point, the piston 115 of the upper jack is actuated downwardly to urge the housing 31 downwardly. The downward stress on the housing 31 is transmitted to the work element 43 through the work holder 37 which is clamped by the sleeves 35 and 36. The downward stress effects a compressive stress through the load cell 44 against the lower piston 42. If the strain of the work specimen against the lower piston permits any downward displacement of the work holder 37, a change in the pressure environment is avoided since the fluid flows through the passages 39 in the work holder. In this manner, the pressure environment surrounding the specimen 43 is maintained uniformly and precisely at the desired pressure level by the cooperation of the opposed pistons 41 and 42, regardless of the stress on or displacement of the work holder 37. The displacement of the work holder 37 is capable of being measured by a differential transformer 46 positioned intermediate the frame 118 and the housing 31. As the housing 31 is displaced downwardly by the piston 115 of the upper jack, the specimen 43 is subjected to compressive stress. By the same token, upward displacement of the housing 31 by the piston 115 relieves compressive stress upon the specimen 43.

Figure 5:
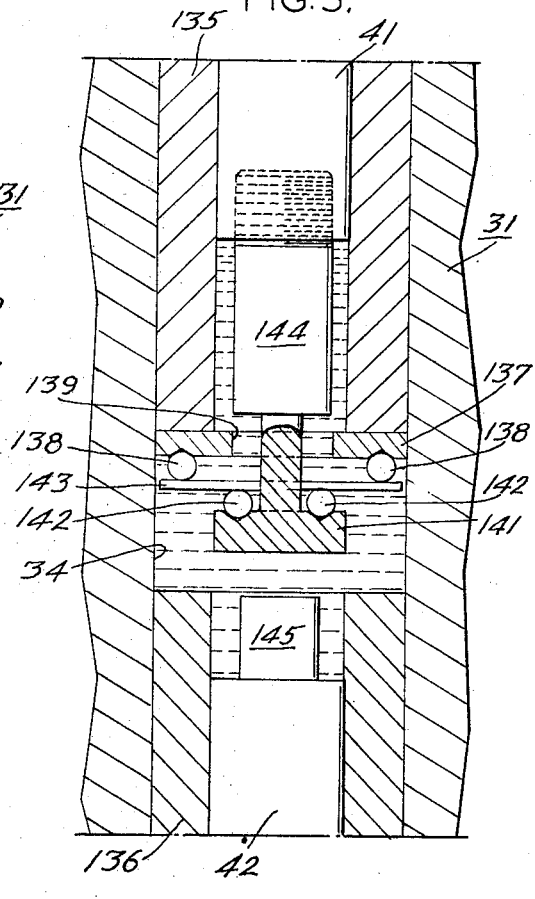
FIG. 5 is an enlarged sectional view illustrating an arrangement in the stress stand for imparting bending stress to a work specimen in accordance with the invention.

Other types of stress may be applied to work specimens by changing the character of the work holder. For example, FIG. 5 illustrates a modified work holder for applying a bending stress to a specimen. In this embodiment, lining sleeves 135 and 136 are provided which are foreshortened in comparison to the sleeves 35 and 36 so as to expose the full diameter of the bore 34 for mounting a work specimen 143 therein. The work specimen 143 is a thin rectangular member supported centrally by the piston 41 and bearing at its opposite ends against a work holder 137 mounted on the bottom of the upper sleeve 135. The work holder 137 comprises a disk having a central aperture 139 and recesses or detents on its undersurface for receiving hardened bearing elements 138. A load cell 144 is mounted in and depends downwardly from the upper piston 41 and is provided at its lower end with a work support 141 of T-shaped cross section, the stem of which extends through the aperture 139. The upper surface of the T-bar 141 is provided with detents or recesses for receiving bearing members 142 upon which the work specimen 143 is supported. Thus, it is apparent that the work specimens may be stressed between the chamber 31 and the upper piston 41 upon relative displacement therebetween.

In the operation of this embodiment, as in the previous embodiment, a charge of pressure fluid is inserted into the bore 34 after the word specimen 143 is in place between the bearing elements 138 and 142 respectively. The lower piston 42 is displaced towards the upper piston 41 to compress the fluid to the desired extent, the aperture 139 of the work holder 137 affording freedom for fluid communication between the pistons 41 and 42. When the piston 42 has been displaced sufficiently to provide the desired pressure environment within the bore 34, as indicated by the coil gage 145, it is locked in place to insure maintenance of the desired pressure environment. Thereafter, the chamber 31 is displaced downwardly, carrying with it the sleeve 135 and stressing the work specimen 143 between the bearing elements 138 and 142. When the desired bending stress has been placed upon the specimen 143, the stress may be relieved by returning the chamber 31 toward its upper limit position.

Where it is desired to have a substantially higher pressure environment for stressing the work specimen, a double pressure vessel may be employed, as shown in FIG. 6. In this embodiment, the stressing stand may be similar to the stand shown in FIG. 3 including a frame 218 having an upper jack with a piston 215 and a lower jack 213 with a driver 212 projecting upwardly therefrom. A pressure vessel 220 is suspended from a cross arm 221 mounted on the piston 215 of the upper jack. The pressure vessel 220 comprises an outer support cylinder 222 having a pressure chamber or stressing housing 231 mounted interiorly thereof between an upper plug 223 and a lower plug 224. The housing 231 is spaced from the plugs 223 and 224 by suitable spacers 225 and 226 and fluid communication is provided between the spaces by passages 227 through the housing. The stressing housing 231 is formed with a central bore 234 in which are mounted upper and lower sleeves 235 and 236 respectively.

Means is provided to produce a pressurized fluid jacket for the housing 231 within the bore 234 and to this end, the plug 223 slidably receives an upper piston head 241 depending from the frame 218, and the plug 224 slidably receives a lower piston head 242 carried by the driver 212 of the lower jack. The piston head 241 has an extension 241a forming a piston which is slidable in the sleeve 235 and the piston head 242 has an extension 242a forming a piston which is slidable in the sleeve 236. Thus, when the jack 213 is actuated to displace the driver 212 upwardly, the piston heads 241 and 242 act in opposition to one another to pressurize the fluid both within the support cylinder 222 and within the bore 234. The sizes of the piston heads and of the piston extensions relative to the spaces within the cylinder 222 are such that there is a substantially higher pressure created within the bore 234 than in the space intermediate the housing 231 and the plugs 223 and 224 so that there is a step-down in pressure from the bore 234 to the space surrounding the housing 231 and then a further step-down in pressure from this space to the outside atmosphere. By reason of this arrangement, a substantially higher pressure may be created within the bore 234 without danger of leakage to the atmosphere or other failure.

In order to stress a work specimen in the pressurized environment within the bore 234, the specimen is mounted intermediate one of the piston extensions and one of the sleeves. In the embodiment illustrated in FIGS. 6–8, the arrangement is such as to afford tensile stressing of the work specimen. To this end, a work holder 237 is mounted on the lower sleeve 236, for example by a threaded fastener 238. Sufficient clearance is provided to afford fluid communication around the holder 237 and the connector 238 to afford free fluid communication intermediate the piston extensions 241a and 242a. A similar work holder 247 is mounted on the upper piston extension 241a through the medium of a threaded connector 248 which includes a load cell 244. A coil gage 245 in mounted on the extension 242a to indicate the desired pressure environment.

To effectively stress the work specimen between the work holders 237 and 247, the specimen is formed as shown at 250 in FIG. 7 with a straight body portion and flared end portions. Opposed pairs of jaws 251 and 252 are provided to mount the work specimen 250 in the work holders 247 and 237. The jaws 251 and 252 are generally semi-cyclindrical in shape and are adapted to mate with one another to engage a flared end of the work specimen 250. When mated, the jaws form a cylindrical plug which is externally threaded for engagement in the respective work holders 247 and 237. In order to insure that the work specimen 250 is completely surrounded by the pressure environment, guide channels 254 are provided in the jaws 251 and 252 to admit pressure fluid into the interior of the jaws behind the work specimen. The guide channels are formed on the mating faces of the jaws 251 and 252 so as to mate with one another when the jaws are assembled onto a work specimen.

The guide channels 254 also provide means for preventing relative rotation between the upper and lower jaws respectively during the stressing operation, so as to insure uniform stressing of the work specimen 250 when subjected to repeated stressing operations. To this end, a guide pin 255 is inserted in the mating channels 254 of the upper and lower jaws so as to interconnect the jaws and prevent their relative rotation. As shown in FIG. 8, the guide pin is provided with a flat 256 on one side so as to permit flow of fluid through the channel 254 during the stressing operation so as to avoid any interference by the guide means with the control pressurized environment of the work specimen 250.

As described above, the embodiment of FIGS. 6 to 8 inclusive provide for tensile testing of a work specimen in a pressure environment substantially higher than the pressure environment provided by the apparatus of the previous embodiments. It is apparent that if it is desired to apply bending stress or compressive stress to a specimen in a high pressure environment on the order provided by the apparatus of FIGS. 6 to 8, it is a simple expedient to substitute the work holders and sleeves of the previously-described embodiment for the work holders and sleeves of the present embodiment. By the same token, if it is desired to utilize the apparatus of the previously-described embodiments for applying a tensile stress to a work specimen, the work holders and sleeves of the previous embodiment may be replaced by the work holder and sleeve arrangement shown in FIGS. 6 to 8 inclusive.

While particular embodiments of the present invention have been herein illustrated and described, it is not intended to limit the invention to such disclosure, but changes and modifications may be made therein and thereto within the scope of the following claims:

I claim:
1. Apparatus for stressing specimens in a pressure environment comprising a pressure chamber having a longitudinal bore therein, a pair of opposed pistons slidable longitudinally in said bore in opposition to one another to thereby pressurize pressure fluid contained in said bore to a predetermined extent, means to relatively immobilize said pistons relative to one another after attaining the desired pressure in said bore, means to mount a work specimen in said bore within said pressurized fluid between said chamber and one of said pistons, and means to displace said chamber with respect to said relatively-immobilized pistons to thereby stress said specimen without varying the pressure of said environment.

2. Apparatus according to claim 1 wherein said specimen-mounting means includes at least one sleeve rigidly mounted in said bore in fixed relation to said chamber, a work holder carried by said sleeve to engage the work specimen, and means carried by said one piston to engage said work specimen.

3. Apparatus according to claim 2 wherein said work holder comprises a cylindrical member mounted in said bore and having fluid passage means therethrough affording fluid communication intermediate said pistons.

4. Apparatus according to claim 2 wherein said work holder comprises an annular member mounted in said bore and having an aperture therein affording fluid communication therethrough, said piston-carried means comprising a T-shaped member having a stem passing through said aperture and anchored to said one piston, and bearing members on the respective confronting surfaces of said annular member and said T-shaped member to engage the work specimen therebetween.

5. Apparatus according to claim 2 wherein said work holder and said piston-carried means each includes a jaw having mating elements adapted to engage and retain said work specimen therebetween.

6. Apparatus according to claim 1 wherein said mounting means includes a load cell to measure the stress applied to said specimen and including a coil gage mounted on the other piston to indicate the pressure of said pressurized fluid in the bore.

7. Apparatus according to claim 1 including a stressing stand mounting said member, said stand including a frame rigidly mounting one of said pistons, a first jack operable upon the other of said pistons to effect said pressurization of the pressure fluid in said bore, and a second jack having a piston supporting said chamber for displacement relative to said frame to thereby effect said stressing of the work specimen.

8. Apparatus according to claim 1 including a support cylinder surrounding said pressure chamber and providing a jacket of pressure fluid therearound, and control means to pressurize the fluid jacket to a pressure intermediate atmospheric pressure and the pressure of the fluid within said pressure chamber.

9. Apparatus according to claim 8 wherein said jacket-pressure control means comprises opposed piston heads in axial alignment with said pressure chamber and cooperable to provide said pressurized fluid jacket, said chamber pistons comprising extensions of said piston heads whereby said pressure chamber is pressurized concurrently with said jacket.

References Cited

UNITED STATES PATENTS 2,483,803 10/1949 Bridgman et al. ----- 73—94 X
3,205,703 9/1965 Horvereid ---------- 73—94 X JERRY W. MYRACLE, Primary Examiner U.S. Cl. X.R.

73—37